(12) United States Patent
DeKeuster et al.

(10) Patent No.: US 9,520,587 B2
(45) Date of Patent: Dec. 13, 2016

(54) BUS BAR ASSEMBLY CARRIER

(71) Applicant: Johnson Controls Technology Company, Holland, MI (US)

(72) Inventors: Richard M. DeKeuster, Racine, WI (US); Robert J. Mack, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 143 days.

(21) Appl. No.: 14/501,906

(22) Filed: Sep. 30, 2014

(65) Prior Publication Data

US 2016/0093862 A1 Mar. 31, 2016

(51) Int. Cl.
*H01M 2/20* (2006.01)
*B60L 11/18* (2006.01)
*H01M 2/10* (2006.01)

(52) U.S. Cl.
CPC .......... *H01M 2/206* (2013.01); *B60L 11/1879* (2013.01); *H01M 2/1077* (2013.01); *H01M 2220/20* (2013.01)

(58) Field of Classification Search
CPC ... H01M 2/206; H01M 2220/20; H01M 2/024
See application file for complete search history.

(56) References Cited

U.S. PATENT DOCUMENTS

| | | |
|---|---|---|
| 6,168,883 B1 | 1/2001 | Urry |
| 6,399,238 B1 | 6/2002 | Oweis et al. |
| 6,424,117 B1 | 7/2002 | Vejraska |
| 7,029,787 B2 | 4/2006 | Bando et al. |
| 7,320,843 B2 | 1/2008 | Harrington |
| 7,604,507 B1 | 10/2009 | Millon |
| 7,611,798 B2 | 11/2009 | Yoon et al. |
| 7,871,723 B2 | 1/2011 | Ikeda et al. |
| 8,235,732 B2 | 8/2012 | Garascia et al. |
| 8,313,855 B2 | 11/2012 | Muis |
| 8,399,128 B2 | 3/2013 | Kim et al. |
| 8,475,954 B2 | 7/2013 | Ijaz et al. |
| 8,530,069 B2 | 9/2013 | Wood et al. |
| 8,563,161 B2 | 10/2013 | Ogasawara et al. |
| 8,580,423 B2 | 11/2013 | Kim et al. |

(Continued)

FOREIGN PATENT DOCUMENTS

WO 2014011801 A1 1/2014

OTHER PUBLICATIONS

PCT/US2015/036968 International Search Report and Written Opinion dated Oct. 2, 2015.

*Primary Examiner* — Stewart Fraser
(74) *Attorney, Agent, or Firm* — Fletcher Yoder P.C.

(57) ABSTRACT

A battery module includes a housing having an opening and a plurality of electrochemical cells disposed in the housing. The plurality of electrochemical cells have electrode terminals. The battery module also includes a carrier defined by an outside boundary and coupled to the plurality of electrochemical cells. The outside boundary of the carrier and the housing are in a nested arrangement. The battery module also includes a bus bar assembly disposed on the carrier, the bus bar assembly includes bus bars that electrically couple the electrode terminal of one of the plurality of electrochemical cells to a respective electrode terminal of another one of the plurality of electrochemical cells.

29 Claims, 9 Drawing Sheets

(56) References Cited

U.S. PATENT DOCUMENTS

| | | |
|---|---|---|
| 8,597,378 B2 | 12/2013 | Zhao et al. |
| 8,609,276 B2 | 12/2013 | Han et al. |
| 8,703,325 B2 | 4/2014 | Pellenc |
| 8,741,472 B2 | 6/2014 | Yamamoto et al. |
| 8,748,021 B2 | 6/2014 | Lim |
| 2004/0058233 A1 | 3/2004 | Hamada et al. |
| 2006/0208698 A1 | 9/2006 | Maguire et al. |
| 2010/0248008 A1 | 9/2010 | Sugawara et al. |
| 2011/0135994 A1 | 6/2011 | Yang et al. |
| 2011/0212352 A1 | 9/2011 | Wood et al. |
| 2013/0288530 A1* | 10/2013 | Zhao ............... H01M 2/206 439/627 |
| 2013/0344377 A1 | 12/2013 | Ogasawara et al. |
| 2014/0212724 A1* | 7/2014 | Lee ............... H01M 2/1094 429/99 |
| 2014/0363711 A1* | 12/2014 | Zhao ............... H01M 10/486 429/90 |
| 2015/0072193 A1* | 3/2015 | Balk ............... B60R 16/03 429/82 |
| 2015/0072195 A1* | 3/2015 | Soleski ............... B60R 16/03 429/90 |
| 2015/0072196 A1* | 3/2015 | Soleski ............... B60R 16/03 429/90 |
| 2015/0072206 A1* | 3/2015 | Houchin-Miller ...... B60R 16/03 429/120 |

\* cited by examiner

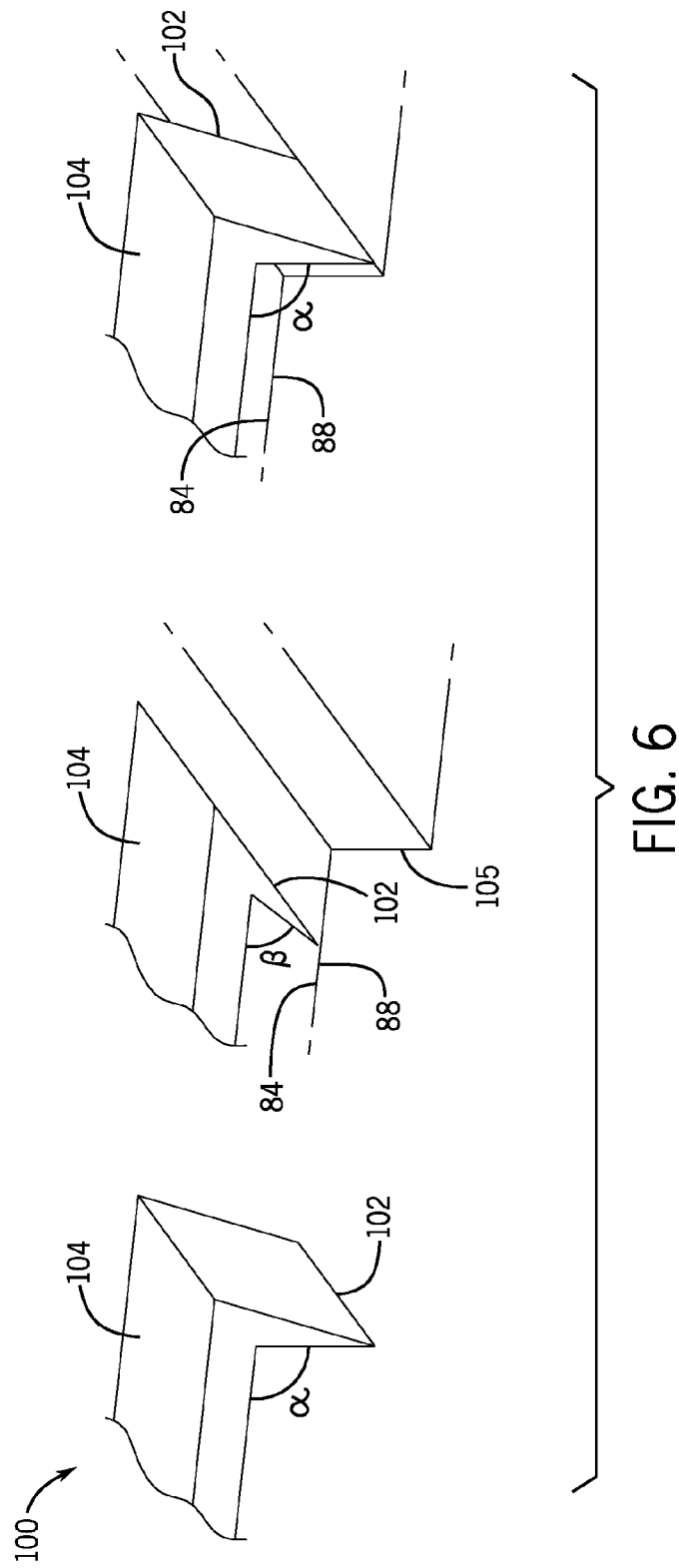

BUS BAR ASSEMBLY CARRIER

BACKGROUND

The present disclosure relates generally to the field of batteries and battery modules. More specifically, the present disclosure relates to water management features for Lithium-ion (Li-ion) battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, traditional battery modules generally include bus bars that electrically couple one electrochemical cell with another electrochemical cell within the battery module. The bus bars may be bolted onto electrochemical cell terminals or may be positioned on an E-carrier that is welded or bolted onto the battery module. As such, the bus bars and/or the E-carrier may be difficult to remove for accessing the electrochemical cells (e.g., in case one or more electrochemical cells need to be replaced). In addition, because the electrochemical cells may differ in size and shape, it may be difficult to position the bus bars and/or the E-carrier on the electrochemical cell terminals, and thereby affect electrical coupling of the electrochemical cells.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with a first embodiment, a battery module includes a housing having an opening and a plurality of electrochemical cells disposed in the housing. The plurality of electrochemical cells have electrode terminals. The battery module also includes a carrier defined by an outside boundary and coupled to the plurality of electrochemical cells. The outside boundary of the carrier and the housing are in a nested arrangement. The battery module also includes a bus bar assembly disposed on the carrier, the bus bar assembly includes bus bars that electrically couple the electrode terminal of one of the plurality of electrochemical cells to a respective electrode terminal of another one of the plurality of electrochemical cells.

In accordance with a second embodiment, a battery module includes a housing having an opening, a carrier nested within the housing and including an outer periphery corresponding to a dimension of the opening, a plurality of terminal openings corresponding to a position of electrode terminals associated with a plurality of electrochemical cells disposed within the housing, and springs disposed on an inner surface of the carrier. The springs may abut an electrochemical cell surface between the electrode terminals.

In accordance with a third embodiment, a battery module includes a housing having an opening and a carrier disposed in the opening. The carrier includes fasteners on an outer periphery of the carrier configured to secure the carrier to the housing, one or more vias corresponding to an anticipated position of electrochemical cell terminals associated with electrochemical cells disposed within the housing, and springs disposed on an inner surface of the carrier. The springs may abut an electrochemical cell surface between the electrochemical cell terminals.

DRAWINGS

Various aspects of this disclosure may be better understood upon reading the following detailed description and upon reference to the drawings in which:

FIG. 6 is a schematic diagram of an embodiment of a position of the fasteners on the E-carrier of FIG. 3 during coupling of the E-carrier with the housing of the battery module of FIG. 3;

Figure 1:
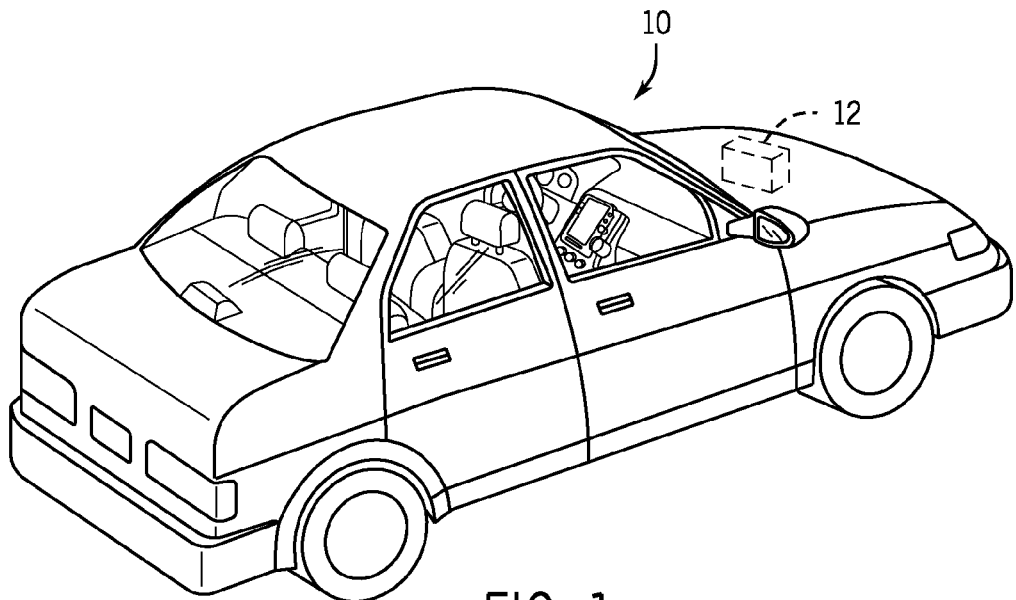
FIG. 1 is perspective view of an embodiment of a vehicle having a battery system contributing all or a portion of the motive power for the vehicle.
Figure 2:
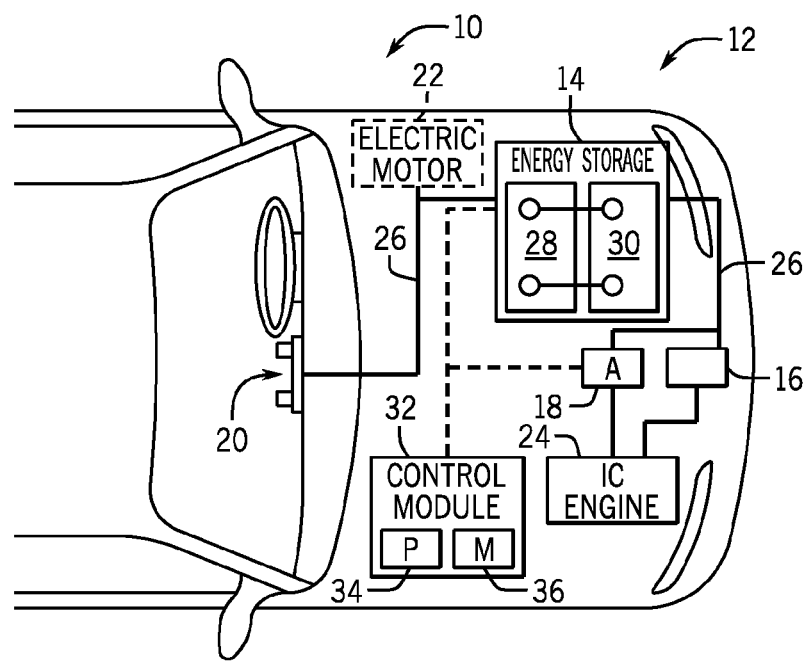
FIG. 2 illustrates a cutaway schematic representation of an embodiment of the vehicle of FIG. 1 provided in the form of a hybrid electric vehicle.
Figure 3:
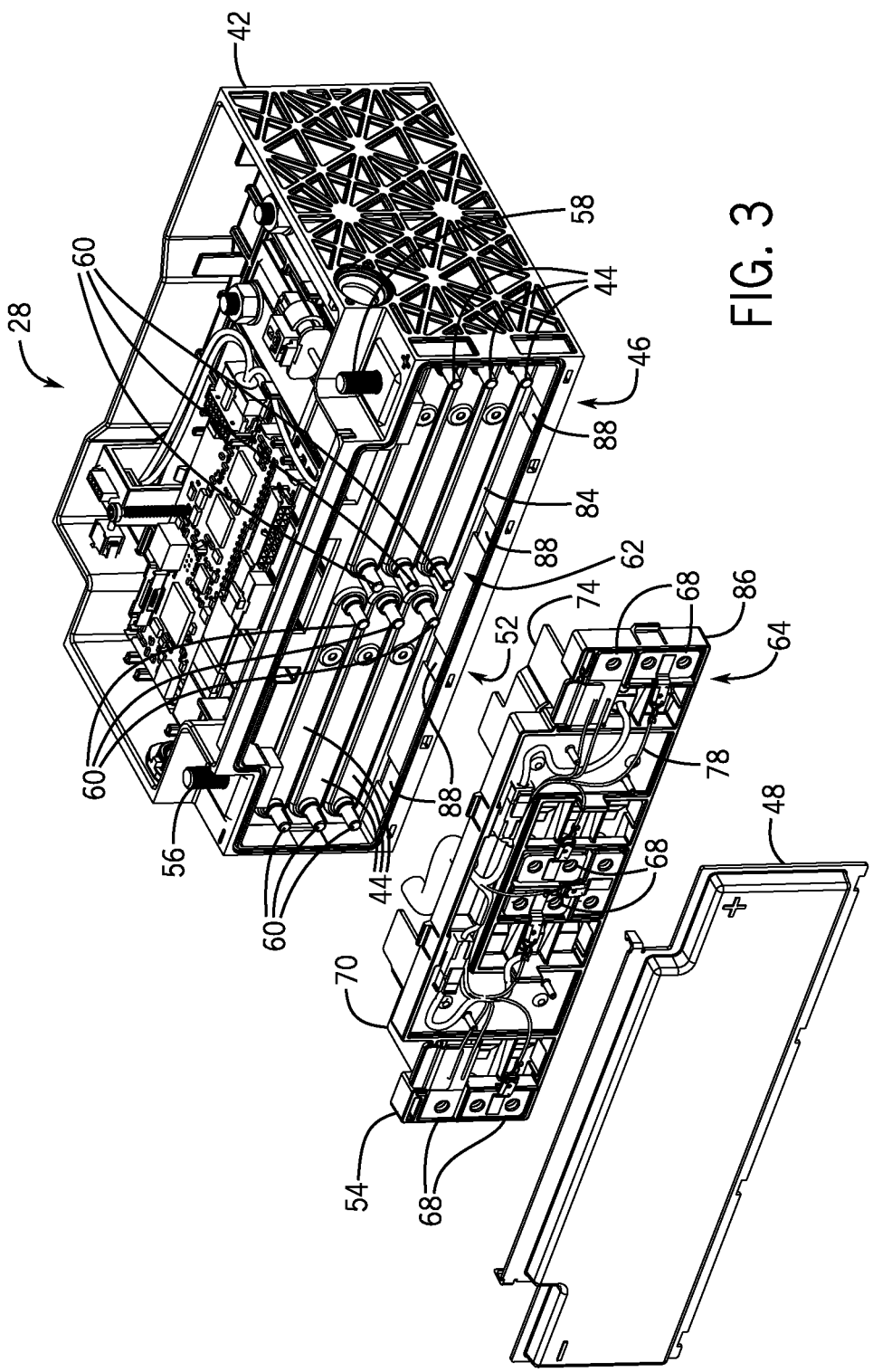
FIG. 3 is a perspective view of an embodiment of components of a 12 Volt (V), lithium ion battery module that may be used with the vehicles of FIGS. 1 and 2, the battery module having an E-carrier configured to snap-fit in the battery module.
Figure 11:
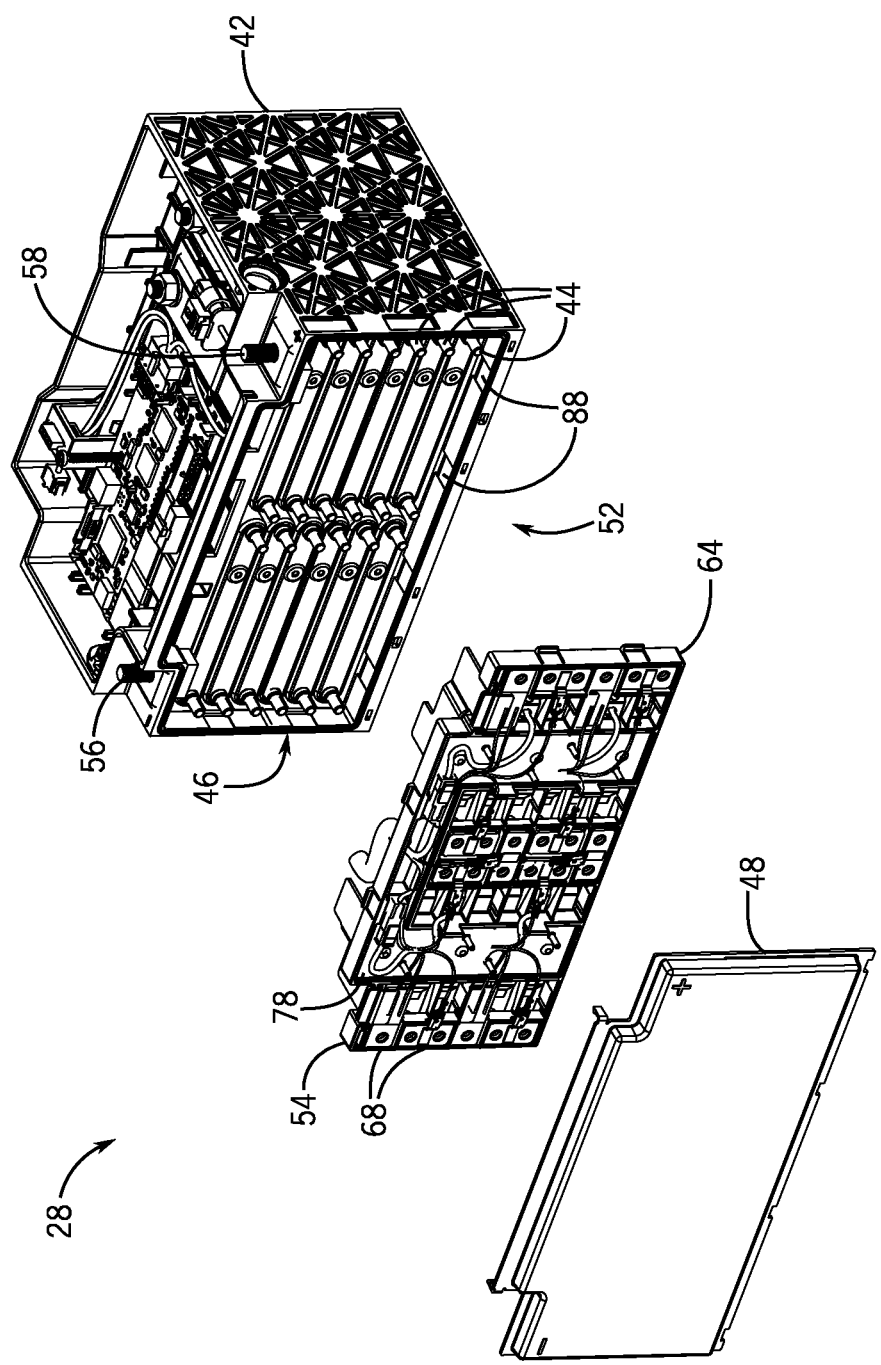
Figure 12:
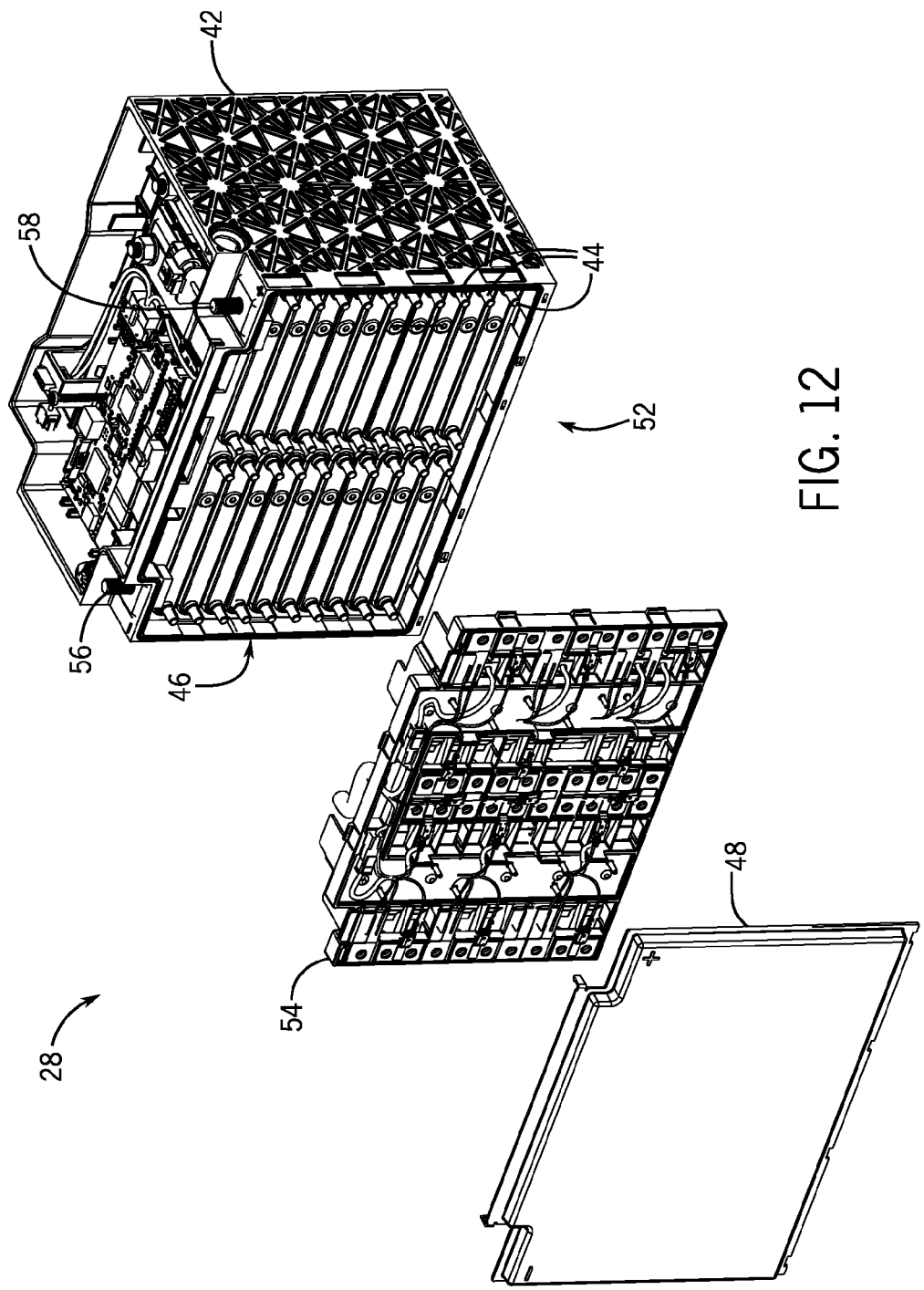

FIG. 11 is a perspective view of an embodiment of the battery module of FIG. 3, the battery module includes components that form part of a second 12V lithium ion battery module that may be used with the vehicles of FIGS. 1 and 2; and FIG. 12 is a perspective view of an embodiment of the battery module of FIG. 3, the battery module includes components that form part of a 48V lithium ion battery system that may be used with the vehicles of FIGS. 1 and 2.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Present embodiments are generally directed toward a device of a battery module, the device being configured to integrate the terminals of a plurality of electrochemical cells disposed in the battery module with various other electrical features of the battery module. The device, referred to herein as an "E-carrier," may be considered to be an integrated bus bar and voltage sense subassembly. In general, the electrochemical cells in a battery module may be slightly different in size and shape. Therefore, it may be difficult to connect the electrochemical cells with the other electrical features of the battery module and electrically couple one electrochemical cell with another electrochemical cell. The E-carrier may place the electrochemical cells in a predetermined arrangement, and thereby allow the electrochemical cells to be connected to the other electrical features of the battery module (e.g., a bus bar assembly) and to each other. In addition, the E-carrier may include features that facilitate assembly of the battery module by enabling a nested arrangement of the battery module housing, the electrochemical cells, and the E-carrier. It may be desirable to form such a nested arrangement in which the E-carrier is maintained in the housing, for example using various connection features and methods. The techniques described herein may reduce or eliminate the use of bolts, welding, and so forth, of bus bar assemblies to battery module housings, which may facilitate manufacture and reduce costs.

In accordance with embodiments of the present disclosure, the various connection features and methods used to produce the nested arrangement may include snap fitting, clasping, friction or interference fitting, press fitting, an O-ring positioned between the E-carrier and the housing, and so forth. In this way, the E-carrier may be removably coupled to the battery module housing. As such, if one or more electrochemical cells needs to be accessed, the E-carrier may be easily removed from the battery module housing to access the electrochemical cells in the battery module. Further, while these coupling methods (snap fitting, clasping, friction or interference fitting, press fitting, an O-ring positioned between the E-carrier and the housing, and so forth) may be used in any combination in accordance with the present disclosure, the nested arrangement is described in the context of being formed using a snap-fit coupling to a battery module housing to facilitate discussion.

Again, in certain configurations, the E-carrier may mechanically couple to the housing without the use of bolts, adhesives, or the like. In other words, the E-carrier may be considered to be toolessly (e.g., removable without the use of tools) and removably coupled to the housing to form a nested arrangement of a battery module housing, battery cells, and the E-carrier. As discussed herein, the battery modules are lithium ion battery modules that utilize lithium ion electrochemical cells, though the present disclosure is intended to cover any type of electrochemical cell. Any number of the electrochemical cells may be used, but the present approaches are described herein in the context of two different 12V battery modules having different capacities, and one 48V battery module. The electrochemical cells are substantially the same in terms of type (e.g., size and chemistry), and may have standardized dimensions and may have a particular manufacturing tolerance to account for manufacturing variations. Accordingly, as may be appreciated, the difference between the battery modules is the number of the electrochemical cells utilized, and the manner in which the electrochemical cells are electrically connected.

The electrochemical cells described herein may be prismatic battery cells, where a prismatic battery cell, as defined herein, includes a prismatic case that is generally rectangular in shape. In contrast to pouch cells, the prismatic casing is formed from a relatively inflexible, hard (e.g., metallic) material. However, it should be noted that certain of the embodiments described below may incorporate pouch cells in addition to or in lieu of prismatic battery cells. In accordance with present embodiments, each prismatic battery cell may include a top casing portion, where electrode terminals (e.g., positive and negative cell terminals) are located. One or more cell vents may also be located on the top casing portion. The prismatic cell casing also includes a bottom casing portion positioned opposite the top casing portion. First and second sides, which may be straight or rounded, extend between the bottom and top casing portions in respective positions corresponding to the electrode terminals. First and second faces, which may be flat or rounded, couple the first and second sides at opposing ends of each cell.

With the foregoing in mind, the present embodiments relating to a snap-on E-carrier may be applied to any battery or battery system, in particular battery systems employed in an xEV (e.g., an mHEV). For example, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/ or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or processor 34 and one or more memory 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM) and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

Each lithium ion battery module 28 is responsible for packaging (e.g., housing) or containing a plurality of electrochemical cells. Voltage and/or capacity of the battery module 28 is generally determined by a number of the plurality of electrochemical cells packaged in the battery module 28. For example, a 12V battery module with a first, relatively low capacity (e.g., 10 Ah), may include 6 electrochemical cells connected in series, a 12V battery module with a second, relatively high capacity (e.g., 20 Ah) includes, for example, 12 electrochemical cells connected in a series arrangement of parallel-connected pairs, and a 48V battery module includes, for example, 20 electrochemical cells connected in series. FIG. 3 is a cross sectional view of an embodiment of the battery module 28. The battery module 28 illustrated in FIG. 3 includes a housing 42 that may be metallic (e.g., made from steel, aluminum, or another suitable metal) or may be polymeric (e.g., polypropylene, acrylonitrile butadiene styrene (ABS), a polystyrene (PS), a polyimide (PI), or another suitable polymer or plastic or combination thereof).

The housing 42 holds one or more electrochemical cells 44 (e.g., lithium-ion cells, nickel metal hydride cells, lithium polymer cells, or any other suitable electrochemical cell) of the battery module 28. The electrochemical cells 44 are disposed in the housing 42 through a housing opening 46. A housing cover 48 is sealed over the housing opening 46 to completely enclose the electrochemical cells 44, and thereby form the battery module 28. The housing cover 48 may be manufactured from metallic or polymeric materials (e.g., polypropylene), similar to the housing 42.

As discussed above, depending on the voltage and/or capacity requirements, as well as the individual voltage and coupling of each cell, the battery module 28 may include any number of electrochemical cells 44, such as between one and forty. For example, the battery module 28 may include six, twelve, twenty, or more electrochemical cells 44. The electrochemical cells 44 may be inserted into the housing 42 as a cell stack 50 (see also FIG. 4). In other embodiments, each electrochemical cell 44 may be individually indexed in trays, cell slots, or similar structure disposed in the housing 42. Further, the housing 42 may include additional structures, such as spacers, to separate the electrochemical cells 44 or the cell stack 50 from other electrochemical cells 44 or cell stacks 50.

Depending, for example, on the desired overall housing dimensions (e.g., length and width) of the battery module 28, the electrochemical cells 44 may be arranged in separate columns 52. As a general example, each column 52 may have half of a total number of the electrochemical cells 44 in the battery module 28. In the illustrated embodiment, the battery module 28 includes three electrochemical cells 44 in each column 52 for a total of twelve electrochemical cells 44. In other embodiments, such as those illustrated in FIGS. 11 and 12, each column 52 may include six or ten electrochemical cells 44 for a total of twelve (for a 12V high capacity battery system) and twenty (for a 48V battery system) electrochemical cells 44, respectively, in the battery module 28. A snap-on E-carrier 54 may be used to hold the electrochemical cells 44 in place within the housing 42. The snap-on E-carrier 54 may include features that interface with a set number of the columns 52 in the battery module 28, as discussed in detail below with reference to FIG. 9. The columnar arrangement of the electrochemical cells 44 may enable standardized dimensions (e.g., length and width) for the housing 42. That is, because the length and width of the housing 42 may be the same for 12V low capacity, 12V high capacity, and 48V battery modules.

In addition, a battery housing, such as the housing 42, having a standardized width may enable the use of multiple snap-on E-carriers 54 on the same or different sides of the battery module 28. The number of snap-on E-carriers 54 may depend on the total number of electrochemical cells 44 in each column 52. For example, in certain embodiments, the battery module 28 with six electrochemical cells 44 in each column 52 may use one snap-on E-carrier 54 and the battery module 28 with twelve electrochemical cells 44 in each column 52 may use two snap-on E-carriers 54. As should be noted, any number and/or arrangement of the electrochemical cells 44 and the snap-on E-carriers 54 may be used depending on the configuration and desired power for the battery module 28 and/or the available space the battery module 28 will occupy.

The electrochemical cells 44, as a group, may provide power to the electric vehicle (e.g., xEV 10 or HEV) through a pair of terminals 56 and 58 that connect the battery module 28 to an electrical load (e.g., circuit). For example, in the illustrated embodiments, the electrochemical cells 44 each have a positive electrode (e.g., a cathode) and a negative electrode (e.g., an anode) enclosed within a casing (e.g., packaging) of the respective electrochemical cell. The positive and negative electrodes each have electrode terminals 60 extending through a cell surface 62. The electrodes may be made of a conductive collector material, such as, aluminum, stainless steel, nickel, copper, or tin, depending on the desired physical properties (e.g., yield strength, electrical resistivity, chemical compatibility, and so forth) and the active material on the electrodes. In some embodiments, the electrodes are coated electrodes in which an electrode active material is coated onto the conductive collector material. For example, the positive electrode may be coated with cathode active materials such as, but are not limited to, lithium metal oxides (LMO) such as lithium nickel cobalt manganese oxide (NMC) (e.g., $LiNi_{1/3}CO_{1/3}Mn_{1/3}O_2$), lithium nickel cobalt aluminum oxide (NCA) (e.g., $LiNi_{0.8}CO_{0.15}Al_{0.05}O_2$), lithium cobalt oxide (LCO) (e.g., $LiCoO_2$), and lithium metal oxide spinel (LMO-spinel) (e.g., $LiMn_2O_4$), and combinations thereof. Similarly, the negative electrode may be coated with anode active materials such as, but not limited to, graphite, lithium titanium oxide (LTO) and derivatives thereof, or any other suitable anode active materials.

Each of the electrochemical cells 44 in the battery module 28 is electrically connected to at least one other electrochemical cell 44 using connectors provided in the form of bus bars, or a similar conductive element, to form a conductive path. For example, as illustrated in FIG. 3, the battery module 28 includes bus bar assembly 64 coupled to the snap-on E-carrier 54 (e.g., a substrate). The bus bar assembly 64 provides a conductive path for the electrochemical cells 44. Accordingly, the bus bar assembly 64 includes bus bars 68 that electrically couple the electrode terminal 60 for the positive electrode of one electrochemical cell 44 with the electrode terminal 60 for the negative electrode of a second electrochemical cell 44. In this way, multiple electrochemical cells 44 may be connected in series or in parallel to provide a desired electrical power output to the vehicle (e.g., xEV or HEV) or other load. The bus bar assembly 64 may also include a plurality of sensors (e.g., voltage sensors, current sensors, temperature sensors) to monitor and/or evaluate a condition of the battery module 28.

Figure 4:
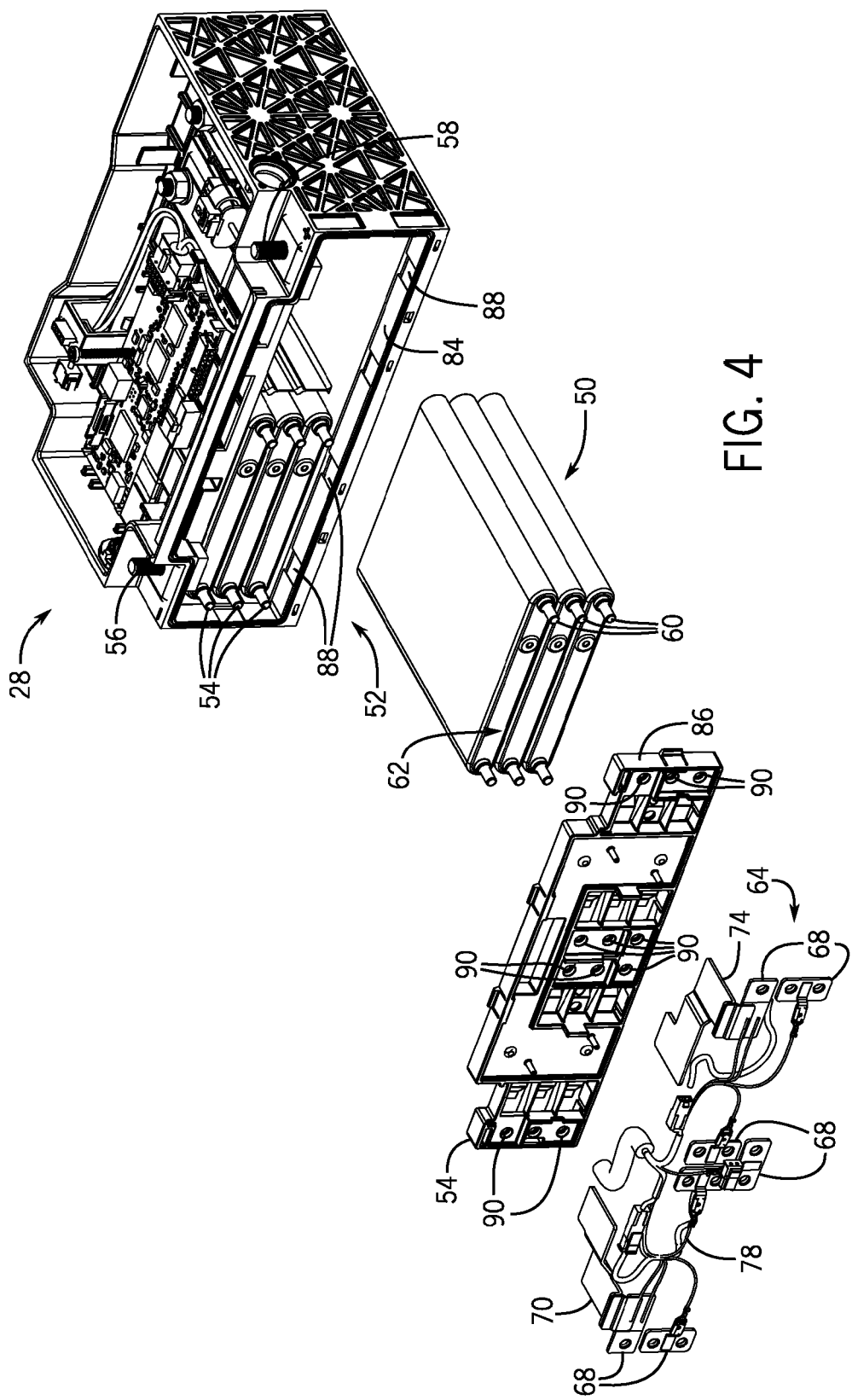
FIG. 4 is a partially exploded perspective view of the battery module of FIG. 3.

In addition to the bus bars 68, the bus bar assembly 64 includes bus bar positive and negative contacts 70 and 74, respectively. The contacts 70 and 74 enable the bus bars 68 to connect to the respective negative and positive terminals 56 and 58, respectively, of the battery module 28. As illustrated in FIGS. 3 and 4, the bus bars 68 and the positive and negative contacts 70 and 74 are electrically interconnected by a flex circuit 78 (e.g., bus bar interconnects) to obtain the desired voltage and capacity rating for the battery module 28. That is, the flex circuit 78 includes features that determine whether the cells are electrically connected in series and/or in parallel. The flex circuit 78 generally includes a flexible, dielectric material which includes relatively thin copper traces (e.g., circuit traces) that electrically interconnect the terminals 60 of the electrochemical cells 44 with the positive and negative contacts 70 and 74. Non-limiting examples of flexible dielectric materials that may be used for the flex circuit 78 include polymers such as polyethylene naphthalate, polyimide, or the like.

Generally, the bus bars 68 and contacts 70 and 74 include materials such as, but not limited to, aluminum, copper, tin-plated copper, or any other suitable conductive material. For example, in embodiments where the electrochemical cells 44 utilize aluminum terminals (e.g., the terminals 60), as in the case of a NMC/LTO lithium ion cell, the bus bars 68 may also be aluminum. Indeed, it is presently recognized that when the anode active material is LTO, rather than, for instance, graphite, the conductive collector (e.g., the current collector), the electrode terminals 60, and the bus bars 68 may all be aluminum. In this way, galvanic effects occurring from copper and aluminum interfaces may be mitigated. In embodiments where copper is used in the bus bars 68, the aluminum portions of the bus bar assembly 64 may transition to copper in the circuit traces of the flex circuit 78 or at a portion of the bus bar 68 that is distal from the electrochemical cell terminal (e.g., the terminal 60), at the bus bar positive and negative contacts 70 and 74, or a similar location, or any combination thereof. That is, the bus bar assembly 64 may be, in some areas, bimetallic. As should be noted, other configurations are within the scope of the present disclosure.

As discussed above, the bus bar assembly 64 is coupled to the snap-on E-carrier 54. The snap-on E-carrier 54 facilitates coupling of the bus bar 68 to the housing 42 of the battery module 28, and also coupling of the bus bar assembly 64 with the electrochemical cells 44. Accordingly, the snap-on E-carrier 54 includes certain features that removably attach the bus bar assembly 64 to the housing 42 without the use of bolts, adhesives, or the like. It should be noted that the battery modules described herein may generally include the same design features relating to the snap-on E-carrier 54 and the housing 42, where the snap-on E-carrier 54 snap-fits into the housing 42, and the housing cover 48 is disposed over the snap-on E-carrier 54 to fully enclose the electrochemical cells 44 and the bus bar assembly 64 within the housing 42. Accordingly, the snap-on E-carrier 54 will be described generally with respect to the 12V battery module of FIG. 3 having a 10 Ah capacity.

As shown in FIG. 3, the housing 42 includes an E-carrier contact surface 84, which is positioned on the inside of the housing 42 in a region of the housing 42 that is proximate (e.g., surrounding) the terminals 60. Similarly, the snap-on E-carrier 54 includes a housing contact surface 86 (e.g., an outer periphery surface), which is sized to fit within the housing opening 46. In certain embodiments, the housing contact surface 86 may be sized so as to have a tight tolerance with the housing opening 46 that abuts the E-carrier contact surface 84. The tight tolerance may cause the snap-on E-carrier 54 to fit into the housing 42 via an interference (friction, press) fit. However, as described in further detail below with reference to FIG. 5, the snap-on E-carrier 54 may, additionally or alternatively, include fastening members (e.g., tabs, cantilevers) that retain the snap-on E-carrier 54 within or against the housing 42, for example, in a corresponding recess 88 or crevice of the housing 42.

FIG. 4 is a schematic representing the manner in which the various electrical components of the battery module 28 interface with the snap-on E-carrier 54. While the different battery modules (e.g., the battery module 28) described herein differ in terms of the number of electrochemical cells, a number of features are common to all the battery modules in accordance with certain embodiments. For instance, the manner in which the bus bars 68, the electrochemical cells 44, the housing 42, and the housing cover 48 each interface with the snap-on E-carrier 54 are generally the same across the different battery modules.

While the snap-on E-carrier 54 in the illustrated embodiment is depicted as being separate from the bus bar assembly 64, it should be appreciated that in certain embodiments, the bus bar assembly 64, or portions thereof (e.g., the bus bars 68 and bus bar interconnects) may be integral with the snap-on E-carrier 54 by way of overmolding or some other integration method that is permanent. That is, in such integral embodiments, the bus bar assembly 64, or portions thereof, cannot be removed from the snap-on E-carrier 54 without breaking the snap-on E-carrier 54. The E-carrier 54 may be molded over the bus bar assembly 64 such that the bus bar interconnects (e.g., the flex circuit 78) and the bus bars 68 are positioned within the snap-on E-carrier 54, and protrude out from the snap-on E-carrier 54 in regions where electrical connections may be desired. For instance, the overmolded bus bars 68 may protrude out of the snap-on E-carrier 54 in terminal openings 90 to enable electrical connection with the electrochemical cells 44.

Figure 5:
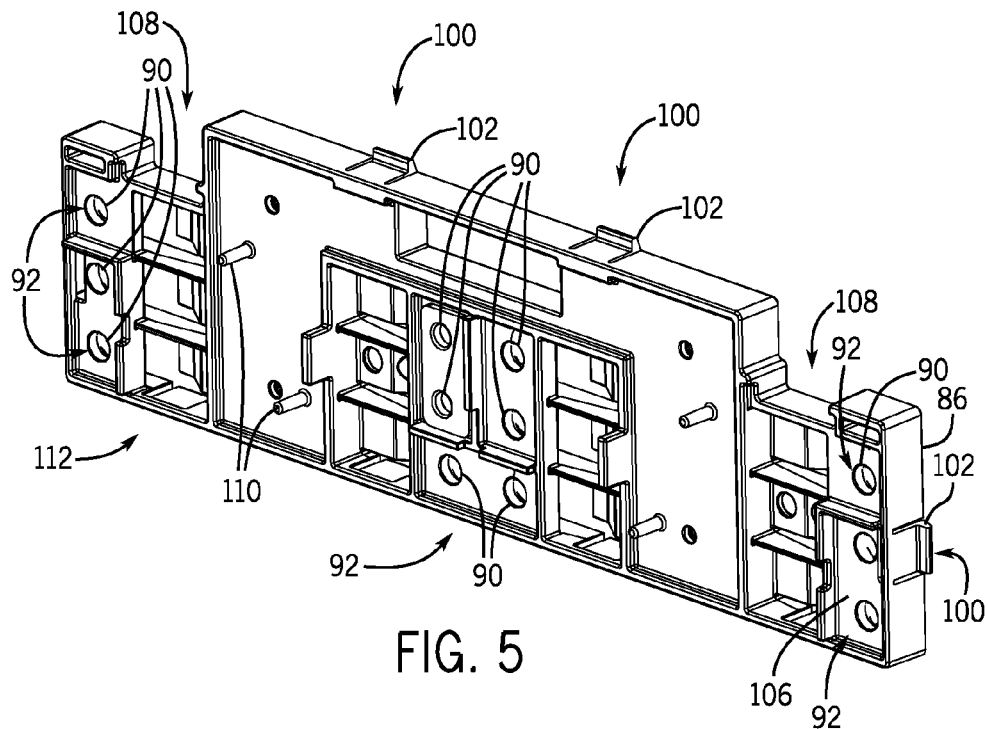
FIG. 5 is a perspective view of an embodiment of an outer surface of the E-carrier of FIG. 3, the E-carrier having fasteners that enable the E-carrier to be snap-fit into a housing of the battery module of FIG. 3.

To better illustrate certain features of the snap-on E-carrier 54, FIG. 5 illustrates an expanded perspective view of an outwardly facing side (e.g., away from the electrochemical cell surface 62) of an embodiment of the snap-on E-carrier 54. As shown in FIG. 5, the snap-on E-carrier 54 also includes bus bar recesses 92 configured to receive the bus bar 68. The bus bar recesses 92 may be angled with respect to one another to accommodate different bus bar configurations. Indeed, there may be different orientations, shapes, and so forth, to accommodate different types of connections. For example, the bus bar recesses 92 may also generally correspond with the position of the terminal openings 90 on the snap-on E-carrier 54 that receive the electrode terminals 60. This particular spatial relationship facilitates electrical connection of the bus bars 68 to the electrochemical cells 44, via the electrode terminals 60, while also allowing for certain degrees of variation within the standardized dimensions established for the electrochemical cells 44. Alternatively, in certain embodiments, the bus bars 68 may connect to bus bar interconnections (not shown) that are positioned at an offset from, but are electrically coupled to, the electrode terminals 60.

In addition to the bus bar recesses 92, the snap-on E-carrier 54 includes fasteners 100 (e.g., tabs or cantilevers). In certain embodiments, the fasteners 100 may be protrusions with or without a hook shape or other curvature or similar geometric feature. As should be noted, the fasteners 100 may be disposed on any peripheral surface (e.g., the housing contact surface 86) of the snap-on E-carrier 54, such as the top, bottom, left, and right sides of the snap-on E-carrier 54. In addition, the snap-on E-carrier 54 may include any number of the fasteners 100 having any suitable arrangement (e.g., spacing) around the housing contact surface 86 of the snap-on E-carrier 54. For example, the snap-on E-carrier 54 may have 1, 2, 3, 4, 5, or more fasteners 100 spaced apart on one or more peripheral surfaces. The fasteners 100 may, as set forth above, interface with corresponding recesses on the E-carrier contact surface 84 of the housing 42 of the battery module 28. As such, the snap-on E-carrier 54 may snap-fit into a mated relationship with the housing 42.

Figure 7:
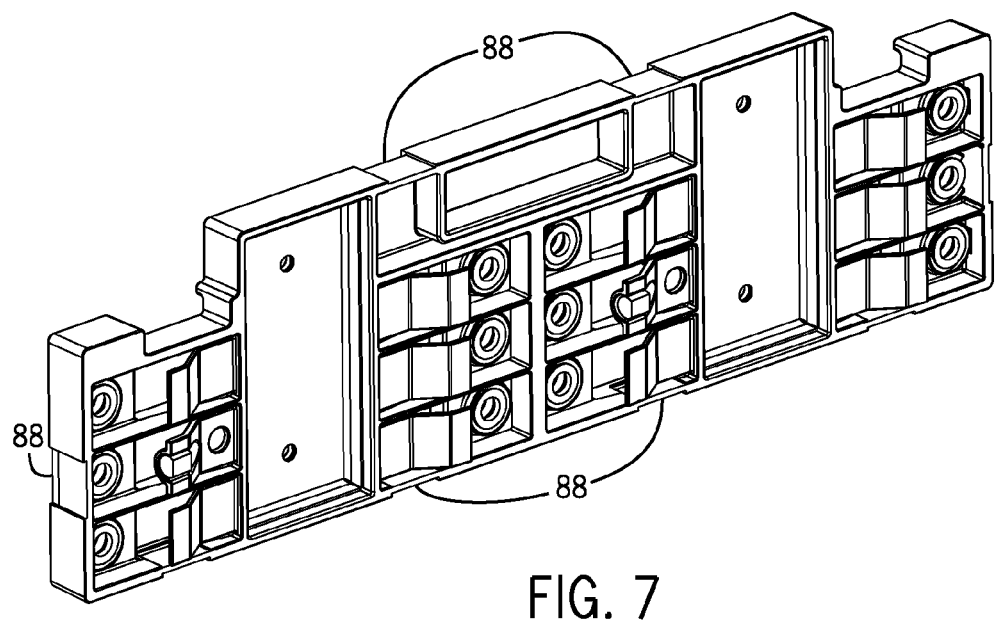
FIG. 7 is a perspective view of an embodiment of the E-carrier of FIG. 3, the E-carrier having recesses that enable the E-carrier to be snap-fit into a housing of the battery module of FIG. 3.
Figure 8:
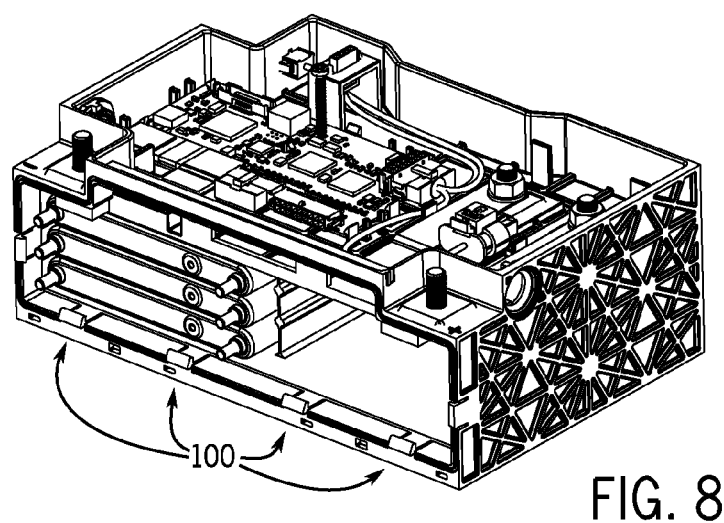
FIG. 8 is a perspective view of an embodiment of the battery module of FIG. 3, the battery module having fasteners on an inside surface of a housing that enable the E-carrier of FIG. 3 to snap-fit into the housing of the battery module.

FIG. 6 is a diagram illustrating a position of the fastener 100 before, during, and after coupling with the housing 42. Moving from left to right, the diagram of FIG. 6 illustrates the fastener 100 before coupling with the housing 42. The fastener 100 includes a hook 102 that forms an angle α relative to a base 104 of the fastener 100. During coupling of the snap-on E-carrier 54 to the housing 42, the hook 102 abuts the E-carrier contact surface 84 at the recess 88 and is forced toward the base 104. As such the angle α is decreased, as indicated by angle 13 in the middle diagram of FIG. 6. The recess 88 includes a step 105 that enables the snap-on E-carrier 54 to snap into the housing 42. For example, as illustrated in the diagram on the right, movement of the fastener 100 toward the step 105 allows the hook 102 to return to its original position and snaps the snap-on E-carrier 54 to the housing 42. The hook 102 is retained by the step 105 and secures the snap-on E-carrier 54 to the housing 42. It is also within the scope of the present embodiments for the corresponding recesses to be on the snap-on E-carrier 54, as illustrated in FIG. 7, and the fasteners 100 to be on the housing 42, e.g., on an internal or external surface of the housing 42, as illustrated in FIG. 8.

As discussed above, the snap-on E-carrier 54 includes the terminal openings 90 that receive the electrode terminals 60 of respective positive and negative electrodes of the electrochemical cells 44. The terminal openings 90 are positioned within each bus bar recess 92 to enable the electrode terminals 60 to extend (e.g., protrude) through a bus bar contact surface 106 (e.g., outer surface) of the snap-on E-carrier 54. Accordingly, the snap-on E-carrier 54 has a reduced wall thickness at and around the terminal openings 90 that forms the bus bar recess 92. The reduced wall thickness may facilitate a better contact between the bus bars 68 and the electrode terminals 60 than would otherwise be obtained. However, it should be noted that in other embodiments, the snap-on E-carrier 54 may not have a reduced wall thickness in the vicinity of the terminal openings 90, and therefore the electrode terminals 60 may not protrude through the terminal openings 90. In certain embodiments, the terminal openings 90 may include a terminal retaining feature that secures the electrode terminals 60 of the electrochemical cells 44 to the snap-on E-carrier 54. For example, at least a portion of the terminal openings 90 may have an inner diameter substantially equal to an outer diameter of the electrode terminals 60. Therefore, in certain embodiments, the electrode terminals 60 may be secured within the terminal openings 90 via an interference fit.

In addition to the bus bar recesses 92, the snap-on E-carrier 54 includes recesses 108 on a portion of the housing contact surface 86. The recesses 108 receive the contacts 70 and 74 of the bus bar assembly 64, and facilitate electrical coupling of the contacts 70 and 74 to the respective negative and positive terminals 56 and 58 of the battery module 28. Depending on the configuration of the housing 42 and location of the negative and positive terminals 56 and 58, the snap-on E-carrier 54 may or may not include the recesses 108.

The snap-on E-carrier 54 may also include retaining posts 110 on a bus bar assembly contact surface 112. The retaining posts 110 may provide structural support to the bus bar interconnects (e.g., circuit traces) and/or the flex circuit 78. The flex circuit 78 may include corresponding vias (openings) that couple to the retaining posts 110 such that the retaining posts 110 secure and provide structural rigidity to, and support, the flex circuit 78.

In certain embodiments, when the snap-on E-carrier 54 is coupled to the bus bar assembly 64, the retaining posts 110 protrude out from a surface of the bus bar assembly 64. Accordingly, the retaining posts 110 may also enable the snap-on E-carrier 54 to mechanically couple with and guide the housing cover 48 during assembly. For example, the retaining posts 110 may mate with corresponding recesses on the housing cover 48, and thereby secure the snap-on E-carrier 54 to the housing cover 48. In addition to securing the snap-on E-carrier 54 with the housing cover 48, the retaining posts 110 may also facilitate alignment between the housing 42, the snap-on E-carrier 54, and the housing cover 48. Furthermore, coupling the retaining posts 110 with recesses on the housing cover 48 may maintain a position of the housing cover 48 relative to the housing 42 during a manufacturing completion process, such as laser welding or another process for securing the housing cover 48 to the housing 42.

Figure 9:
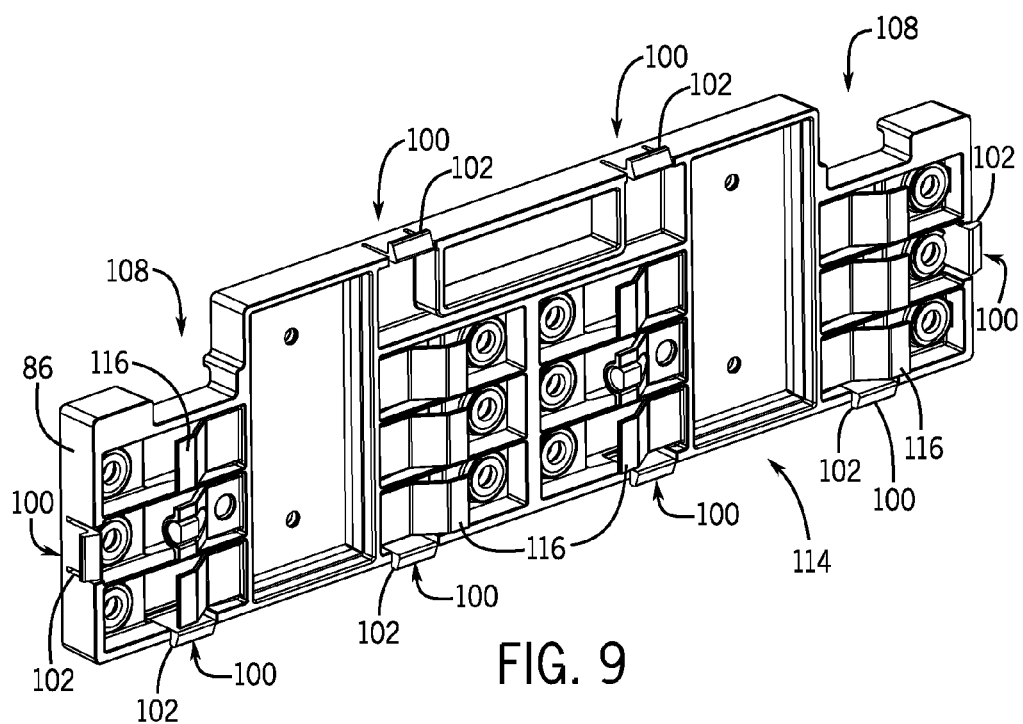
FIG. 9 is a perspective view of an inner surface of the E-carrier of FIG. 3, the inner surface having springs that contact respective surfaces of electrochemical cells of the battery module of FIG. 3.

FIG. 9 is a perspective view of the snap-on E-carrier 54 illustrating an electrochemical cell contact surface 114 (e.g., inner surface) that abuts a surface (e.g., casing) of the electrochemical cells 44 (e.g., the electrochemical cell surface 62) of the battery module 28. Again, the difference between the illustrated snap-on E-carrier 54 and the snap-on E-carriers of other battery modules having different capacities and/or voltages (e.g., 12V, 20 Ah and 48V battery systems) may be in the number of the fasteners 100, the terminal openings 90, the retaining posts 110, the bus bar recesses 92, and so forth, but may generally have the same configuration.

As depicted in FIG. 9, the electrochemical cell contact surface 114 includes various features that interface with the electrochemical cells 44 in the housing 42. Specifically, the snap-on E-carrier 54 includes a plurality of spring features 116. The spring features 116 may be living springs that are cantilevered to the electrochemical cell contact surface 114, though other spring mechanisms may be used. The spring features 116 may contact a portion of the casing (e.g., the electrochemical cell surface 62) of the electrochemical cells 44 between the electrode terminals 60 of each electrochemical cell 44, and thereby push the electrochemical cells 44 into the housing 42. The spring features 116 apply a compressive force from a top surface (e.g., the electrochemical cell surface 62) of the casing (e.g., the region of the casing between the terminals 60 of each electrochemical cell 44) to a bottom surface substantially opposite the top surface of the casing (e.g., end that goes into the housing 42) of each electrochemical cell 44. In this way, the snap-on E-carrier 54 enables the electrochemical cells 44 to be retained within the housing 42 using substantially no compressive force applied to lateral surfaces of the electrochemical cells. As such, the electrochemical cells 44 may float within the housing 42 in certain configurations (e.g., are not compressed against one another).

The snap-on E-carrier 54, as described herein, may provide several manufacturing advantages. For example, the size of the terminal openings 90 may be varied to allow a desired degree of tolerance for electrochemical cell size, cell orientation within the housing 42, cell terminal shape (e.g., the terminals 60), and so forth. Indeed, as discussed above, the prismatic cells (e.g., the electrochemical cells 44) may not be clamped or otherwise retained within the housing 42 using a compressive force on the lateral faces of the electrochemical cells 44. Accordingly, the snap-on E-carrier 54 may provide a degree of structural rigidity and stability to the cells during operation, manufacture, and transport. The snap-on E-carrier 54 may be formed as a single body from non-conductive polymers using injection molding or any other suitable manufacturing process. Non-limiting examples of non-conductive polymers that may be used for the E-carrier include polypropylene, polyethylene, high heat ABS, or any other suitable polymeric material.

Figure 10:
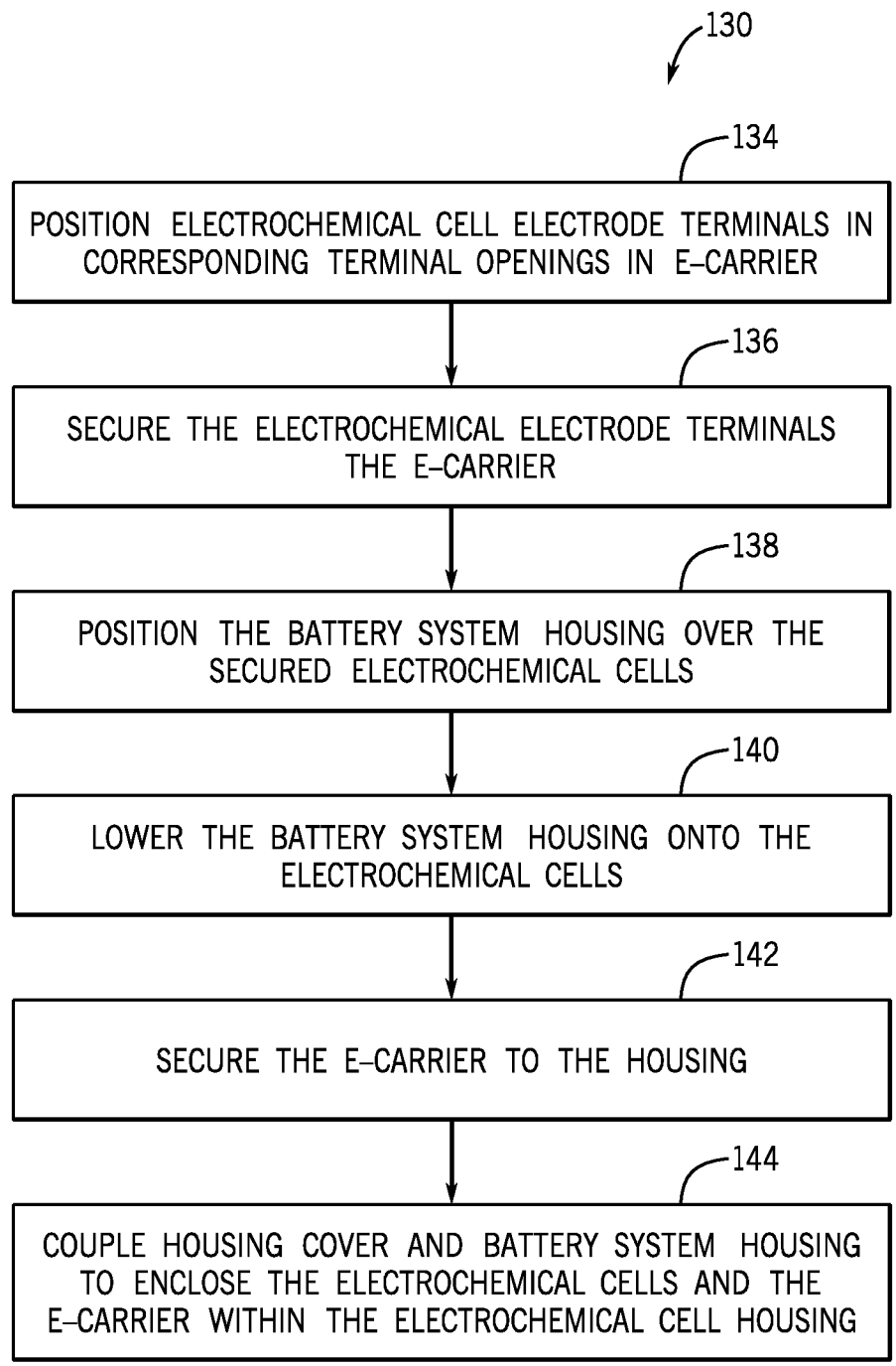
FIG. 10 is a flow diagram of an embodiment of a method for assembling the battery module of FIG. 3.

Furthermore, the interface between the snap-on E-carrier 54 and the electrode terminals 60 of the electrochemical cells 44 may also be sufficiently stable so as to enable the electrochemical cells 44 to be placed into the snap-on E-carrier 54 (e.g., by placing the electrode terminals 60 into the respective terminal opening 90) before placing the electrochemical cells 44 into the housing 42. For example, FIG. 10 is a production method 130 that may be used to assemble the battery module 28. The method 130 includes placing the electrode terminals 60 of the electrochemical cells 44 into the corresponding terminal openings 90 of the snap-on E-carrier 54 (block 134). For example, the snap-on E-carrier 54 may be positioned on a working surface (e.g., a table) with the bus bar assembly contact surface 112 facing down. The electrochemical cells 44 may then be positioned in the snap-on E-carrier 54 such that the terminals 60 are positioned with the openings 90 and the bottom surface of the electrochemical cell casing (e.g., surface opposite the electrode terminals 60) is facing away from the surface 112 and the snap-on E-carrier 54. That is, the bus bar assembly contact surface 112 and the electrode terminals 60 are in contact with or facing toward the working surface.

The method 130 also includes securing the electrochemical cells 44 to the snap-on E-carrier 54 by their electrode terminals 60 (block 136). As discussed above, the terminal openings 90 may facilitate securing the electrode terminals 60 to the snap-on E-carrier 54. Therefore, the snap-on E-carrier 54 may provide structural support to enable the electrochemical cells 44 to remain upright (perpendicular to the working surface).

The method 130 also includes positioning the housing 42 over the electrochemical cells 44 (block 138), and lowering the housing 42 onto the snap-on E-carrier 54 such that the electrochemical cells 44, in combination with the snap-on E-carrier 54, slide into the housing 42 (block 140). In certain embodiments, the electrochemical cells 44 may be positioned over the housing 42. As such, the electrochemical cells 44 are lowered into the housing 42. In such embodiments, the electrochemical cells 44 may be coupled (e.g., welded) to the snap-on E-carrier 54 before or after placement in the housing 42.

After the electrochemical cells 44 are coupled to the snap-on E-carrier 54 and lowered into the housing 42, the method 130 includes securing the snap-on E-carrier 54 to the housing 42 (block 142). For example, in one embodiment, the fasteners 100 snap into the corresponding recesses in the housing 42 once the housing 42 is sufficiently lowered onto the electrochemical cells 44 and the snap-on E-carrier 54. This also secures the electrochemical cells 44 within the housing 42. In other embodiments, the E-carrier 54 forms an interference fit with the housing opening 46 in the housing 42 and secures the electrochemical cells 44 in the housing 42.

In an alternative embodiment, the electrochemical cells 44 may be positioned within the housing 42 before coupling the snap-on E-carrier 54 with the electrode terminals 60. Once the electrochemical cells 44 and the snap-on E-carrier 54 (e.g., with the bus bar assembly 64) are integrated into the housing 42, and the housing cover 48 is coupled to the housing 42 to enclose the electrochemical cells 44 and the snap-on E-carrier 54 within the housing 42 to produce the battery module 28 (block 144). The housing cover 48 may be secured onto the housing 42 with adhesives or welding, depending on the materials used to manufacture the housing 42 and the housing cover 48.

As discussed above, the snap-on E-carrier 54 and the E-carriers used with battery modules having different voltages and/or capacities have similar configurations. As such, the description set forth herein is intended to generally apply to all other snap-on E-carriers unless stated otherwise. For example, FIGS. 11 and 12 illustrate 12 cell and 20 cell embodiments of the battery module 28. Similar to the battery module 28 of FIGS. 3 and 4, the battery modules of FIGS. 11 and 12 include the electrochemical cells 44 in a columnar arrangement and an embodiment of the bus bar assembly 64 that interconnects the electrochemical cells 44 in a series and/or parallel arrangement. The bus bar assembly 64 is mounted on the respective snap-on E-carriers 54 having 24 and 40 terminal openings, respectively, for receiving the electrode terminals 60 of the electrochemical cells 44. Notably, the snap-on E-carriers 54 for the battery modules 28 in FIGS. 11 and 12 have substantially the same features as set forth above for the 12V, 10 Ah battery module 28 in FIGS. 3 and 4.

As set forth above, one or more of the disclosed embodiments, alone or in combination, may provide one or more technical effects useful in the manufacture of the battery module and associated use of E-carriers. For example, certain embodiments of the present approach may facilitate assembly of the battery modules during manufacturing. By specific example, the E-carrier may couple the bus bar assembly and other electrical features to a housing of the battery system without the use of bolts, adhesives, or the like. As such, the E-carrier and bus bar assembly may be toolessly and removably coupled to the housing. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications. Furthermore, in an effort to provide a concise description of the example embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module comprising:
   a housing having an opening;
   a plurality of electrochemical cells disposed in the housing, wherein the plurality of electrochemical cells have electrode terminals;
   a carrier defined by an outside boundary and coupled to the plurality of electrochemical cells, wherein the carrier comprises recesses having different orientations, and wherein the outside boundary of the carrier and the housing are in a nested arrangement; and
   a bus bar assembly disposed on the carrier, the bus bar assembly comprising bus bars that electrically couple the electrode terminal of one of the plurality of electrochemical cells to a respective electrode terminal of another one of the plurality of electrochemical cells, and wherein the bus bars are positioned within the recesses of the carrier such that the different orientations of the recesses cause the bus bars to place the electrochemical cells in a predetermined electrical arrangement.

2. The battery module of claim 1, wherein the carrier comprises terminal openings corresponding to a position of the electrode terminals of the electrochemical cells in the battery module, wherein the terminal openings are configured to receive the electrode terminals such that the electrode terminals are in direct contact with the bus bars.

3. The battery module of claim 1, wherein the recesses each correspond to a position of at least one of the electrode terminals of the electrochemical cells in the battery module, and wherein an inner end face of each of the bus bars abuts a corresponding outer surface of one of the recesses.

4. The battery module of claim 3, wherein the recesses are disposed on a carrier outer surface.

5. The battery module of claim 3, wherein the recesses comprise terminal openings such that the electrode terminals protrude into the recesses.

6. The battery module of claim 1, wherein the carrier comprises one or more fasteners configured to mate with a corresponding housing recess disposed on a housing inner surface to enable a snap-fit connection and secure the carrier to the housing.

7. The battery module of claim 1, wherein the carrier comprises one or more additional recesses disposed on an outer periphery surface of the carrier and configured to mate with a corresponding fastener disposed on the housing to enable a snap-fit connection and secure the carrier to the housing.

8. The battery module of claim 1, wherein the carrier comprises a spring disposed on an inner surface of the carrier, and the spring is configured to exert a force against an electrochemical cell surface to retain the electrochemical cells in the housing.

9. The battery module of claim 1, wherein the carrier comprises one or more protrusions disposed on an outer surface of the carrier and configured to couple the carrier with a housing cover.

10. The battery module of claim 1, wherein an outer periphery of the carrier comprises a second dimension substantially equal to a first dimension corresponding to the opening of the housing.

11. The battery module of claim 1, wherein the carrier is configured to be toolessly and removably attached to the housing.

12. The battery module of claim 1, wherein the bus bar assembly comprises a flex circuit electrically coupled to the bus bars connecting the electrochemical cells in a predetermined electrical configuration.

13. The battery module of claim 1, wherein each of the bus bars comprises an inner end face, an outer end face, a first electrode opening, and a second electrode opening separate from the first electrode opening, and wherein the first and second electrode openings extend through the inner and the outer end faces and are sized to receive the electrode terminal of one of the plurality of electrochemical cells.

14. A battery module, comprising:
   a housing having an opening;
   a carrier nested within the housing and comprising:
      an outer periphery corresponding to a dimension of the opening;
      a plurality of terminal openings corresponding to a position of electrode terminals associated with a plurality of electrochemical cells disposed within the housing; and
      springs disposed on an inner surface of the carrier, wherein the springs are configured to abut an electrochemical cell surface between the electrode terminals; and
   a bus bar assembly coupled to an outer surface of the carrier substantially opposite the inner surface, wherein the bus bar assembly comprises bus bars configured to couple to the electrode terminals of one of the plurality of electrochemical cells with a respective electrode terminal of another one of the plurality of electrochemical cells such that the plurality of electrochemical cells are electrically coupled, the bus bars comprise a first electrode receptacle and a second electrode receptacle spaced apart from the first electrode receptacle, and wherein the first and second electrode receptacles are sized to receive the electrode terminal of one of the plurality of electrochemical cells.

15. The battery module of claim 14, wherein the carrier comprises recesses comprising the plurality of terminal openings, wherein the recesses are configured to receive the bus bars.

16. The battery module of claim 15, wherein the recesses are disposed on an outer surface of the carrier substantially opposite the inner surface.

17. The battery module of claim 14, wherein the carrier comprises one or more fasteners disposed on the outer periphery, the fasteners are configured to mate with a corresponding housing recess to secure the carrier to the housing.

18. The battery module of claim 14, wherein the carrier comprises one or more recesses disposed on the outer periphery and configured to mate with a corresponding fastener disposed on the housing to secure the carrier to the battery module housing.

19. The battery module of claim 14, wherein the carrier comprises protrusions disposed on an outer surface of the carrier substantially opposite the inner surface, the protrusions are configured to couple the carrier to a housing cover sized to fit over the carrier when the carrier is in the housing.

20. The system of claim 14, wherein the carrier is configured to be toolessly and removably attached to the housing.

21. A battery module, comprising:
a housing having an opening;
a carrier disposed in the opening, wherein the carrier comprises:
fasteners on an outer periphery of the carrier configured to secure the carrier to the housing;
one or more vias corresponding to an anticipated position of electrochemical cell terminals associated with electrochemical cells disposed within the housing; and
bus bar recesses configured to accommodate bus bars configured to couple to the electrode terminals of one of the plurality of electrochemical cells with a respective electrode terminal of another one of the plurality of electrochemical cells such that the plurality of electrochemical cells are electrically coupled, wherein the bus bar recesses include a first recess and a second recess, wherein the first recess is angled with respect to the second recess to accommodate different bus bar configurations.

22. The battery module of claim 21, comprising a bus bar assembly disposed on the carrier substantially opposite an inner surface of the carrier, wherein the bus bar assembly comprises the bus bars.

23. The battery module of claim 22, wherein the bus bar assembly comprises a flex circuit electrically coupled to the bus bars connecting the electrochemical cells in a predetermined electrical configuration.

24. The battery module of claim 21, wherein the bus bar recesses are disposed on an outer surface of the carrier substantially opposite its inner surface.

25. The battery module of claim 21, wherein the carrier comprises protrusions disposed on an outer surface of the carrier substantially opposite the inner surface, wherein the protrusions are configured to couple the carrier with a housing cover.

26. The battery module of claim 21, wherein the housing comprises recesses that mate with the fasteners to secure the carrier and the housing.

27. The battery module of claim 21, wherein a first dimension of the opening is substantially equal to a second dimension of an outer periphery of the carrier.

28. The battery module of claim 21, wherein the carrier is toolessly and removably coupled to the housing.

29. The battery module of claim 21, wherein the carrier is configured to snap-fit into the housing.

* * * * *